Feb. 17, 1959     R. J. SIGNER     2,873,715
APPARATUS FOR COATING INFLATABLE TUBULAR MATERIALS
Filed Oct. 12, 1955
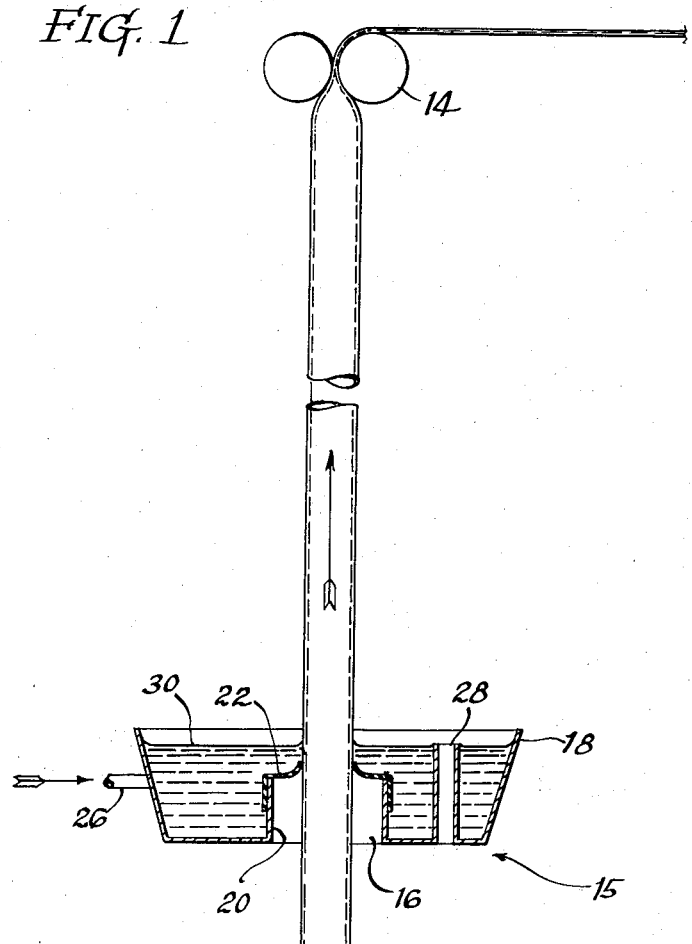
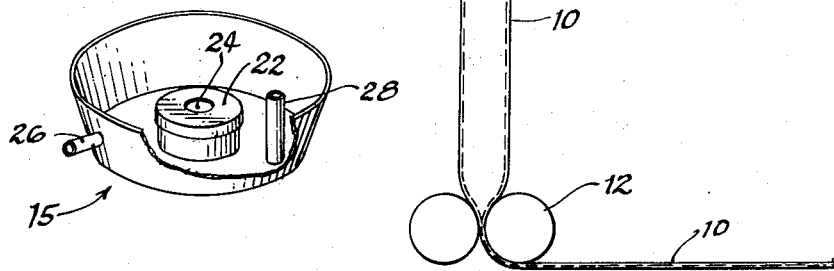
INVENTOR.
Ralph J. Signer
BY Harry H. Levin
Attorney

United States Patent Office 2,873,715
Patented Feb. 17, 1959

2,873,715

APPARATUS FOR COATING INFLATABLE TUBULAR MATERIALS

Ralph J. Signer, Villa Park, Ill., assignor, by mesne assignments, to Union Carbide Corporation, a corporation of New York Application October 12, 1955, Serial No. 539,983

3 Claims. (Cl. 118—34)

The invention relates to coating tubular materials. More particularly it relates to an apparatus for applying a substantially uniform continuous coating on tubular materials.

An object of this invention is to provide an apparatus for coating tubular structures formed of thin self-sustaining film.

The above object is accomplished in general by passing the selected tubing, inflated with a gaseous medium such as air, in an upward direction through a flexible rubber seal, adapted to snugly embrace the entire peripheral wall of the tubing contacting it and, secured to an inner wall of a reservoir in which the level of the coating composition is maintained above the top of the rubber seal. In general, satisfactory coating will be obtained when the level of the coating composition in the reservoir is not lower than that required to provide a meniscus contact with the tubing. Means are provided to maintain automatically the desired level of the coating composition in the reservoir.

The rubber seal is constructed so that it will automatically yield to intimately conform to the contour and any irregularity of the cylindrical surface of the inflated tubing contacting therewith. Because of the intimate conformation of the rubber seal to the tubing there will be no leakage of the composition past the inner edge of the rubber seal and the surface of the tubing being coated.

In the preferred embodiment, the rubber seal is in the form of a tube made of a material which is elastic and has returnable stretch. Thus when an inflated tubing of a diameter greater than that of the rubber seal is passed therethrough, the rubber seal will ride on and automatically follow the contour of the cylindrical surface of the tubing contacting therewith. The material constituting the rubber seal also is relatively impervious and inert to the coating composition in the reservoir. A rubber seal made of seamless extruded vulcanized natural gum rubber tubing is a typical example of a yieldable rubber seal which can be used in connection with coating compositions consisting of aqueous solutions or aqueous dispersions. When the coating composition consists of organic solutions, emulsions, plastisols, etc., which may adversely affect natural rubber, the rubber seal can be made of vulcanized natural gum rubber tubing coated with a material which is inert to the coating composition used for coating the inflated tubing and does not materially detract from the yieldability (flexibility and resiliency) of the rubber. Vulcanized natural gum rubber thinly coated with regenerated cellulose, gelatin, algin, polyethylene, polytetrafluoroethylene trifluorochlorethylene polymer, epoxy resins, phenolic resins, and polyester resins are typical examples of coated materials of which the rubber seal can be made, the specific coating depending on the nature of the coating composition with which the rubber seal is to be used. It is to be understood that though natural vulcanized gum rubber alone or coated as hereinbefore described are preferred materials of which the rubber seal can be made, the invention is not restricted thereto. The rubber seal can be made of any other material having the aforesaid necessary physical properties of yieldability and relative inertness with respect to the coating composition. Typical examples of such other materials are synthetic rubbers for example chloroprene, Buna S (1,3 butadiene-styrene copolymer), Buna N (1,3 butadiene-acrylonitrile copolymer), Butyl rubber (isobutene-isoprene copolymer); plasticized rubber hydrochloride; saran (vinylidene chloride copolymers); highly plasticized cellulose derivatives such as ethyl cellulose; chlorosulfonated polyethylene; etc.

The thickness of the coating applied to the inflated tubing is dependent upon the viscosity of the coating composition and the rate of travel of the surface to be coated. At the same rate of travel of the tubing through the rubber seal, a coating of lesser thickness will be obtained with a coating composition of a lower viscosity than when a coating composition of a higher viscosity is used. Further, a higher rate of travel of the tubing through the rubber seal will result in a thicker coating than a lower rate of travel. In general, the porosity and surface energy of the surface to be coated also affect the thickness of the coating.

The invention is admirably suited and particularly adapted to coating flexible thin walled tubular materials that are self-sustaining and can be inflated with a gaseous medium. Thin walled seamed or seamless tubing made of rubber; rubber hydrohalide; polymers and copolymers of vinyl chloride, vinyl acetate, vinylidene chloride, acrylonitrile; cellulose derivatives such as ethers and esters; regenerated cellulose; and preferably regenerated cellulose reinforced with fibers of flax, hemp, rayon, acrylonitrile, polyethylene terephthalate, etc., are typical examples of tubings which can be coated in accordance with this invention.

The nature of the invention will be more clearly understood by reference to the following detailed description when taken in connection with the accompanying drawings and wherein;

Figure 1 is a vertical section, partly diagrammatic and exaggerated, of an apparatus embodying the principles of this invention, and Figure 2 is a perspective detail of the coating apparatus, the inflated tubing which is to be coated being omitted.

Referring now to the drawings wherein like reference numerals designate like parts, the reference numeral 10 designates a flattened regenerated cellulose tubing reinforced with hemp fibers and which is to be coated. The flattened tubing 10 is fed from a source of supply, not shown, to a pair of rolls 12 and thence vertically upward through a coating apparatus, hereinafter more fully explained, to a second pair of rolls 14. The rolls 12 and 14 are positively driven at peripheral speeds to maintain the inflated tubing 10 taut without sagging and stretching and are positioned with their respective pinch points in alignment.

The section of the tubing 10 between the two pairs of rolls 12 and 14 is in an inflated state and the rolls 12 and 14 serve to maintain a gaseous inflating medium such as air entrapped within the tubing. It is to be noted that the gaseous inflating medium is stationary relative to the traveling tubing and will inflate successive sections of the tubing between the rolls 12 and 14. In general, the pressure of the gaseous inflating medium is such as to provide a cylinder in which the wall thereof will substantially resist deformation by the rubber seal.

The coating apparatus comprises a reservoir 15 having a central passage 16 through which the inflated tubing 10 passes with clearance. For reasons which will appear hereafter, the outer wall 18 of the reservoir 15 is of a height greater than that of the inner wall 20.

A rubber seal 22 made of a flexible material such as vulcanized natural gum rubber tubing is positioned on and secured to the inner wall 20 of the reservoir 15 in any convenient manner so that the rubber seal 22 is in a relatively taut condition and the delivery end thereof in alignment with the passage 16. The circular opening 24 of the delivery end of the rubber seal 22 is of a diameter less than that of the inflated tubing 10 to be coated so that when the inflated tubing passes therethrough the rubber seal 20 will automatically yield and intimately conform to the contour of the tubing engaged thereby and as shown in Figure 1 will also ride upwardly thereon. As shown in Figure 1, the centers of the reservoir passage 16 and weir opening 24 and the pinch points of rolls 12 and 14 are all in alignment.

A liquid coating composition is continuously supplied to the reservoir 15 through an inlet 26. An overflow pipe 28 maintains the level 30 of the coating composition in the reservoir.

As shown in Figure 1, the level 30 of the coating composition within the reservoir 15 is above the top of the rubber seal 22 when it conforms to and rides on the surface of the tubing 10 passing therethrough.

In the preferred embodiment, both the outer wall 18 and the inner wall 20 of the reservoir 15 are circular. However, no precise form and shape of the outer wall 18 is essential. It may be of any geometrical configuration and extends upwardly either vertically or at any appropriate angle. The inner wall 20 should be of a shape and configuration so that the delivery opening of the rubber seal is substantially circular in cross section and can readily conform to the cylindrical surface of the inflated tubing contacting it.

In operation, the inflated tubing which is of a diameter greater than that of the rubber seal opening 24 and less than that of the reservoir passage 16 is fed vertically upwardly and passes through the rubber seal positioned in the path of travel of said tubing. The rubber seal due to its yieldability (flexibility and resiliency) rides upwardly on the tubing and accommodates itself and follows the contour of the tubing contacting therewith. Because the rubber seal intimately conforms to and follows the contour of the tubing within the zone of action of the rubber seal there is provided a substantially leak-proof seal therebetween. As the tubing continues its passage, the coating composition above the rubber seal is continuously applied to the traveling tubing by means of at least a meniscus contact and it adheres thereto by surface tension. The coated tubing continues its upward travel until the coating is tack-free and thence to the rolls 14 where it is flattened. If desired, the tack-free condition may be obtained by drying the coating through the application of heat, in any convenient manner, intermediate the coating and final flattening operation. After flattening, the coated tubing, depending on the nature of the coating, may be further treated or not and finally the tubing is cut into sections constituting casings which are admirably suited for encasing sausage, meat food product, cheese, and other products requiring the properties imparted to the casing by the coating.

Satisfactory results are obtained when the outside diameter of the inflated tubing 10 is preferably approximately 30% greater than the inner diameter of the opening 24 at the delivery end of the rubber seal 22 prior to passage of the inflated tubing therethrough and the diameter of the reservoir passage 16 is preferably approximately 15%–20% greater than the outer diameter of the tubing 10. It is to be understood that the original diameter of the rubber seal prior to positioning in the apparatus is less than the diameter of the reservoir passage 16 so that it will be stretched during positioning thereof on the inner wall of the reservoir 20 and provide the desired diameter at the delivery end thereof.

The rubber seal 22 intimately engages the inner wall 20 of the reservoir 15 and may be further secured in place by suitable means such as adhesive, adhesive tape, bands, etc.

As shown in Figure 2, when the rubber seal 22 is positioned in place, the portion thereof free of the inner wall 20 will normally tend to be in a horizontal plane. However, as shown in Figure 1, when the inflated tubing is passed therethrough it will ride upwardly on and follow the contour of the surface of said tubing. As previously stated, the coating composition in the reservoir 15 is maintained at a level above the position assumed by the rubber seal in operation sufficient to provide at least meniscus contact between it and the surface of the inflated tubing being coated.

The minimum level of the coating composition in the reservoir must be such as to provide meniscus contact between it and the surface of the inflated tubing. However, it is within the scope of this invention to maintain the level of the coating composition in the reservoir so that it will be above the level of the delivery end of the rubber seal riding on the inflated tubing but below that which will exert such hydrostatic pressure as will prevent the rubber seal from following the contour of the surface of the inflated tubing.

In a specific embodiment of this invention when a regenerated cellulose tubing reinforced with hemp fibers was coated as hereinbefore described by meniscus contact between the surface of the inflated tubing traveling at a speed of 12 feet per minute and a coating composition comprising an aqueous latex containing 15% by weight of solids, said solids consisting of 85% of a polymer of 80% vinylidene chloride and 20% acrylonitrile, and 15% of a plasticizer (dibutyl phthalate). After drying as also hereinbefore described the thickness of the coating on the tubing was approximately 0.2 mil. The coating was continuous and substantially uniform over the entire cylindrical wall of the tubing, features which cannot be obtained when tubing is coated in the flattened, uninflated state, by conventional methods.

Coating of greater thickness can be obtained by anyone of the following or combinations thereof:
 (1) Increasing the concentration of solids in the latex;
 (2) Incorporating appropriate modifiers such as algins and silicate to increase the viscosity of the coating compositions;
 (3) Increasing the level of the coating composition;
 (4) Increasing the rate of travel of the inflated tubing.

In general, coatings of a thickness within the range of approximately 0.1 to 0.4 mils can be obtained.

The invention provides a simple and economical apparatus for and method of providing a substantially uniform and continuous coating on tubing regardless of whether said tubing had edge folds formed during the production of said tubing.

Since it is obvious that various changes may be made in the above description without departing from the nature and spirit thereof, this invention is not restricted thereto except as set forth in the appended claims.

I claim:
1. An apparatus for applying a continuous coating to the entire exterior wall of an inflated tubing which comprises means to continuously feed upwardly a tubing in an inflated state, a reservoir having a chamber for containing a coating composition and an opening in said chamber through which the inflated tubing can pass with clearance, said reservoir being positioned in the path of travel of said inflated tubing, an elastic rubber seal enclosing said opening in the chamber, said seal having a central passage of a diameter normally smaller than the inflated tubing and adapted to ride on and follow the contour of the entire peripheral wall of successive sections of said inflated tubing contacting it to provide a leak-proof seal between the peripheral tubing wall and the opening in the reservoir chamber, means to supply a coating composition to said reservoir chamber, and means to maintain the coating composition at a constant level above but adjacent to the elastic rubber seal and providing at least meniscus contact with the peripheral wall surface of said inflated tubing but below that which will exert such hydrostatic pressure as will prevent said rubber seal from following the surface contour of the inflated tubing.

2. An apparatus as set forth in claim 1 wherein the diameter of the inflated tubing is about 30 percent greater than the diameter of the central passage in the rubber seal.

3. An apparatus for applying a continuous coating to the entire exterior wall of an inflated tubing comprising a reservoir having an inner wall spaced from the outer wall to provide a chamber for containing a coating composition and a central passage through which the inflated tubing will pass with clearance, the top of said inner wall being in a horizontal plane lower than the horizontal plane in which the top of the outer wall is disposed, an elastic rubber seal secured to the said inner wall, said seal being formed of a yieldable material and having a central opening normally of a diameter smaller than that of said inflated tubing whereby when said inflated tubing is passed therethrough said seal will ride on and follow the contour of the surface of the inflated tubing contacting therewith to provide a leak-proof seal therebetween, means to maintain a constant level of the coating composition in said chamber to provide at least a meniscus contact with the surface of the inflated tubing passing through said central opening, said rubber seal being positioned below the level of the coating composition but adjacent thereto and means to continuously feed an inflated tubing of a diameter greater than said central opening through said central passage and central opening of said rubber seal and thereby apply a thin uniform continuous coating to said inflated tubing.

References Cited in the file of this patent
UNITED STATES PATENTS

| | | |
|---|---|---|
| 1,911,124 | Linder | May 23, 1933 |
| 2,125,025 | Huckfeldt et al. | July 26, 1938 |
| 2,176,925 | Reichel et al. | Oct. 24, 1939 |
| 2,210,436 | Weingand et al. | Aug. 6, 1940 |
| 2,338,266 | Skoning | Jan. 4, 1944 |
| 2,350,857 | Wolff | June 6, 1944 |
| 2,418,974 | Henry | Apr. 15, 1947 |
| 2,602,959 | Felin | July 15, 1952 |
| 2,642,035 | McDermott | June 16, 1953 |